United States Patent [19]
Jones

[11] Patent Number: 5,874,055
[45] Date of Patent: *Feb. 23, 1999

[54] CHLORIDE ASSISTED HYDROMETALLURGICAL EXTRACTION OF METAL

[75] Inventor: David L. Jones, Delta, Canada

[73] Assignee: Cominco Engineering Services Ltd., Vancouver, Canada

[*] Notice: The term of this patent shall not extend beyond the expiration date of Pat. No. 5,645,708.

[21] Appl. No.: 592,732

[22] Filed: Jan. 26, 1996

Related U.S. Application Data

[63] Continuation-in-part of Ser. No. 488,128, Jun. 7, 1995, Pat. No. 5,650,057, which is a continuation-in-part of Ser. No. 425,117, Apr. 21, 1995, Pat. No. 5,645,708, which is a continuation-in-part of Ser. No. 98,874, Jul. 29, 1993, Pat. No. 5,431,788.

[51] Int. Cl.$^6$ .................. B01D 11/02; C22B 11/00; C22B 15/00; C22B 19/00
[52] U.S. Cl. ................... 423/24; 23/293 S; 205/570; 205/582; 205/583; 205/584; 205/604; 205/606; 205/607; 209/165; 423/27; 423/41; 423/99; 423/578.2; 423/109; 75/743; 75/744
[58] Field of Search .................. 205/582, 583, 205/584, 604, 606, 607, 609, 569, 570, 571; 423/24, 27, 99, 109, 41, 578.2; 209/165; 23/29.35; 75/743, 744

[56] References Cited

U.S. PATENT DOCUMENTS

| | | | |
|---|---|---|---|
| 2,746,859 | 5/1956 | McGauley et al. | 75/115 |
| 3,637,371 | 1/1972 | Mackiw et al. | 75/101 |
| 3,767,760 | 10/1973 | Hougen et al. | 423/22 |
| 3,923,616 | 12/1975 | Atadan et al. | 204/107 |
| 3,962,402 | 6/1976 | Touro | 423/35 |
| 3,981,966 | 9/1976 | Baucom | 423/104 |
| 3,989,607 | 11/1976 | Bush et al. | 204/108 |
| 4,039,406 | 8/1977 | Stanley et al. | 204/108 |
| 4,338,168 | 7/1982 | Stanley et al. | 204/108 |
| 5,316,567 | 5/1994 | Jones | 75/743 |
| 5,431,788 | 7/1995 | Jones | 204/104 |
| 5,645,708 | 7/1997 | Jones | 205/580 |

OTHER PUBLICATIONS

Flett, D.S., "Solvent Extraction in Copper Hydrometallurgy: a Review" *Mineral Processing & Extractive Metallurgy*, Mar. 1974, pp. C30–C37.

Paper entitled "A Hydrometallurgical Conversion Process For The Treatment of Copper Concentrate", Authors: R.W. Stanley et al of the Noranda Research Centre, Presented at the 21st Annual CIM Conference Of Metallurgists, Toronto, Canada, Aug. 29–Sep. 1/82, pp. 1–31.

*Primary Examiner*—Kathryn Gorgos
*Assistant Examiner*—Chrisman D. Carroll
*Attorney, Agent, or Firm*—Elbie R. de Kock

[57] ABSTRACT

A process for the extraction of a metal from an ore or concentrate comprises subjecting the ore or concentrate to pressure oxidation in the presence of oxygen and an acidic solution containing halogen ions and a source of bisulphate or sulphate ions, such as $H_2SO_4$. The metals which can be extracted by the process comprises copper, as well as non-cuprous metals, such as zinc, and precious metals, such as gold and silver.

17 Claims, 6 Drawing Sheets

5,874,055

CHLORIDE ASSISTED HYDROMETALLURGICAL EXTRACTION OF METAL

CROSS REFERENCE TO RELATED APPLICATIONS

This application is a continuation-in-part of U.S. patent application Ser. No. 08/488,128 filed Jun. 7, 1995, now U.S. Pat. No. 5,650,057, which, in turn, is a continuation-in-part of U.S. patent application Ser. No. 08/425,117 filed Apr. 21, 1995, now U.S. Pat. No. 5,645,708, which, in turn, is a continuation-in-part of U.S. patent application Ser. No. 08/098,874 filed Jul. 29, 1993 which issued as U.S. Pat. No. 5,431,788 on Jul. 11, 1995. The contents of the foregoing applications are incorporated herein by reference.

FIELD OF THE INVENTION

This invention relates to the hydrometallurgical treatment of metal ores or concentrates. In particular, it relates to the extraction of metals from ores in the presence of halogen ions, such as chloride ions.

BACKGROUND OF THE INVENTION

Hydrometallurgical treatment of copper sulphide ores, such as chalcopyrite ($CuFeS_2$), is problematical because the severe conditions required in a pressure oxidation step for the effective leaching of copper from these ores results in oxidation of the sulphide in the ore to sulphate, resulting in the generation of large amounts of acid which requires expensive neutralization. Attempts have been made to render the sulphide concentrate leachable under relatively milder conditions under which the sulphide would only be oxidized to elemental sulphur and not all the way through to sulphate. These attempts include the pretreatment of the concentrate prior to the pressure oxidation step to render the sulphide concentrate more readily leachable, and the leaching of the concentrate in the presence of chloride ions, such as described in U.S. Pat. No. 4,039,406. In this process, the copper values in the concentrate are transformed into a solid basic copper sulphate from which the copper values must then be subsequently recovered, as described in U.S. Pat. No. 4,338,168. In the process described in U.S. Pat. No. 4,039,406 a significant amount (20–30%) of sulphide in the ore or concentrate is still oxidized to sulphate, resulting in greater oxygen demand during the pressure leach and the generation of sulphuric acid. This is particularly unfavourable for low grade concentrates, where the S/Cu ratio is high.

The present invention provides a process for the hydrometallurgical extraction of copper and other metals in the presence of halogen ions, such as chloride and bromide in solution.

SUMMARY OF THE INVENTION

According to the invention there is provided a process for the extraction of copper from a sulphide copper ore or concentrate, comprising the steps of: subjecting the ore or concentrate to pressure oxidation in the presence of oxygen and an acidic halide solution to obtain a resulting pressure oxidation slurry and subjecting the slurry to a liquid/solid separation step to obtain a resulting pressure oxidation filtrate and a solid residue containing an insoluble basic copper sulphate salt, characterized in that the pressure oxidation is conducted in the presence of a source of bisulphate or sulphate ions which is selected from the group consisting of sulphuric acid and a metal sulphate which hydrolyzes in the acidic solution and wherein the amount of the source of bisulphate or sulphate ions which is added contains at least the stoichiometric amount of sulphate or bisulphate ions required to produce the basic copper sulphate salt less the amount of sulphate generated in situ in the pressure oxidation.

The process may further comprise the steps of recycling the pressure oxidation filtrate to the pressure oxidation; leaching the solid residue containing the basic copper sulphate salt in a second leaching with an acidic sulphate solution to dissolve the basic copper salt to produce a leach liquor containing copper sulphate in solution and a resulting solid residue; separating the leach liquor from the solid residue; subjecting the leach liquor to a solvent extraction process to produce copper concentrate solution and a raffinate; and recycling the raffinate to the second leaching.

The pressure oxidation may be carried out at a predetermined molar ratio of $H^+/Cu$, where $H^+$ represents the hydrogen ions in the acidic halide solution and Cu represents the copper in the ore or concentrate, so that the pressure oxidation filtrate contains a first portion of the copper in the ore or concentrate and the basic copper salt contains a second portion of the copper in the ore or concentrate and further comprising the steps of: separating the pressure oxidation filtrate and the basic copper salt; leaching the basic copper salt in a second leaching step with an acidic sulphate solution to dissolve the copper salt to produce a second copper solution and a solid residue; and subjecting the pressure oxidation filtrate and the second copper solution to solvent extraction to obtain concentrated copper solution and copper depleted raffinate.

The pressure oxidation may be carried out at a temperature of from about 115° C. to about 160° C., preferably about 150° C.

The process may further comprise the step of subjecting the pressure oxidation slurry to neutralization at a temperature above about 115° C., preferably about 115° C. to 160° C., more preferably about 150° C.

Also according the invention there is provided a process for the extraction of copper from a sulphide copper ore or concentrate, comprising the steps of: leaching the ore or concentrate in a first leaching step with an acidic chloride solution to produce a first copper solution and an insoluble basic copper salt; separating the first copper solution and the basic copper salt; leaching the basic copper salt in a second leaching step with an acidic sulphate solution to dissolve the copper salt to produce a second copper solution and a solid residue; and subjecting the first and second copper solutions to solvent extraction with an organic extractant to produce concentrated copper solution for electrowinning of copper therefrom.

Further according to the invention there is provided a process for the extraction of copper from a sulphide copper ore or concentrate, comprising the steps of: subjecting the concentrate to pressure oxidation in the presence of oxygen and an acidic halide solution to obtain a resulting pressure oxidation slurry; and subjecting the slurry to neutralization at a temperature above about 115° C.

Also according to the invention there is provided a process for the extraction of zinc from a sulphide ore or concentrate containing copper and zinc, comprising the steps of: subjecting the concentrate to pressure oxidation in the presence of oxygen and an acidic halide solution to produce a liquor containing copper and zinc in solution; subjecting the liquor to a first solvent extraction with a copper extractant to remove copper from the solution and to produce a copper depleted raffinate; subjecting the copper depleted raffinate to a second solvent extraction with a zinc extractant to produce a zinc depleted raffinate; and recycling the zinc depleted raffinate to said pressure oxidation.

Further according to the invention there is provided a process for the extraction of precious metals from a copper sulphide ore or concentrate by treating a leach residue of said ore, comprising the steps of: removing elemental sulphur from said leach residue to obtain a low sulphur residue; and subjecting the low sulphur residue to an oxidative leach at elevated temperature and pressure to oxidize sulphur and precious metal compounds present in the low sulphur residue to produce a liquid containing the precious metals in solution.

Also according to the invention there is provided a process for the extraction of precious metals from a copper sulphide ore or concentrate, comprising the steps of: subjecting the concentrate to pressure oxidation in the presence of oxygen and an acidic halide solution to obtain a resulting pressure oxidation slurry; and flashing the slurry to atmospheric pressure in a two-stage let-down in which the first stage is at a temperature of about the freezing point of elemental sulphur.

BRIEF DESCRIPTION OF THE DRAWINGS

The invention will now be described by way of examples with reference to the accompanying drawings, in which.

DETAILED DESCRIPTION OF PREFERRED EMBODIMENTS

The different embodiments of the process according to the invention may be used to treat a range of copper and other metal concentrates in which the grade of copper varies from low, i,e. about 15% copper or less, to high grade, i.e. about 35% copper or more.

Broadly, the process comprises a pressure oxidation step which takes place in the presence of oxygen and an acidic solution of halide ions, e.g. chloride or bromide, and sulphate ions. More specifically, the process further includes an atmospheric leach stage, one or more solvent extraction stages and an electrowinning stage. Different grades of concentrate require different treatment in the pressure oxidation stage, requiring different modes of operation. These modes of operation are termed Mode A, Mode B and Mode C, respectively. In Mode A, which is effective when high grade copper ores are leached, copper is not leached in the pressure oxidation stage. In Modes B and C, which are effective when medium and low grade copper ores are leached, copper is leached in the pressure oxidation stage.

Each of the modes of operation will now be described in turn.

Process Mode A

Figure 1:
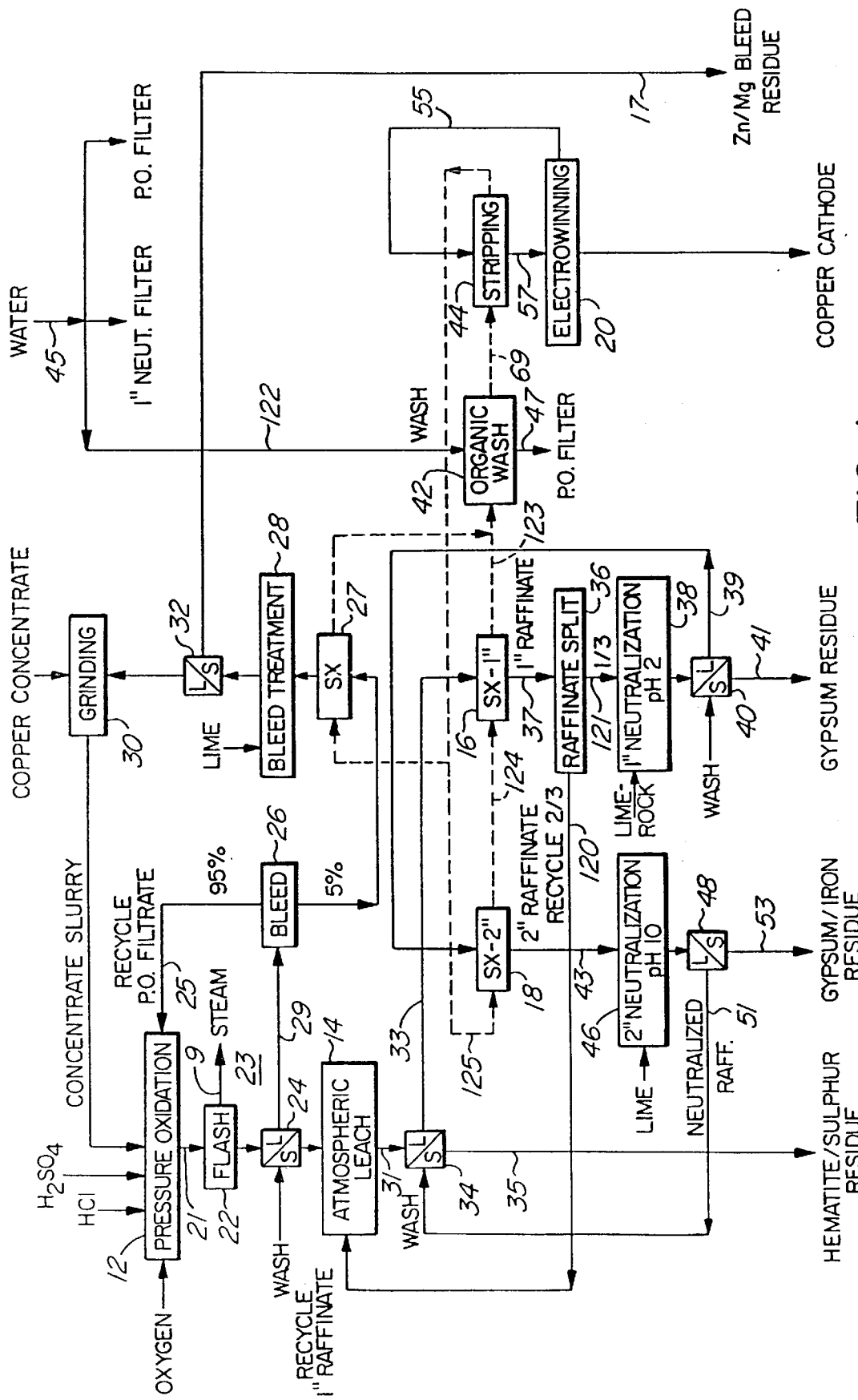
FIG. 1 is a flow diagram of a hydrometallurgical copper extraction process according to one embodiment of the invention, which is suitable for the treatment of high grade copper ores or concentrates.

FIG. 1 is a flow diagram of Mode A. The process comprises a pressure oxidation stage 12 in a pressure oxidation vessel or autoclave, an atmospheric leach stage 14, primary and secondary solvent extractant stages 16 and 18, respectively, and an electrowinning stage 20.

In the pressure oxidation stage 12, all copper minerals are converted to basic copper sulphate, $CuSO_4.2Cu(OH)_2$. The treatment is carried out with oxygen in the presence of an acidic chloride solution. Oxygen, as well as HCl and $H_2SO_4$ are introduced into the autoclave for this purpose. The temperature in the autoclave is about 130°–150° C. and the pressure about 100–200 psig (about 800 kPa to about 1500 kPa) This is total pressure comprising oxygen pressure plus steam pressure. The retention time is about 0.5–2.5 hours and the process is normally carried out in a continuous fashion in the autoclave. However, the process can also be carried out in a batch-wise fashion, if desired.

The solids content in the autoclave is maintained at about 12–25%, i.e. 150–300 g/L solids as determined by the heat balance and viscosity limitations.

The slurry produced in the autoclave is discharged through a series of one or more flash tanks 22 to reduce the pressure to atmospheric pressure and the temperature to 90°–100° C. The liquid part of the slurry is referred to as the product solution from the pressure oxidation stage 12 and is indicated by reference numeral 21.

The slurry from the flash tank(s) 22 is filtered, as shown at 24, and the resultant filter cake is washed thoroughly to remove entrained liquor as much as possible.

The pressure oxidation filtrate from the filtration 24 is recycled to the pressure oxidation stage 12 but there is a small bleed of about 5%, as shown at 26. This bleed 26 is determined by the concentration of the soluble metals in the ore or concentrate which may dissolve during the pressure oxidation stage 12. The bleed 26 is treated at 28 with lime to remove metals such as zinc and magnesium as solid residues, which are present in the copper concentrate, and to counteract buildup of these metals in the pressure oxidation circuit. The pressure oxidation circuit is the circuit from the pressure oxidation stage 12 to the flash tank(s) 22 to the filtration 24 to the bleed 26 and back to the pressure oxidation stage 12. It is indicated by reference numeral 23.

The bleed 26 is subject to a solvent extraction, as shown at 27, prior to the bleed treatment 28. The solvent extraction 27 is carried out by means of a suitable organic extractant to remove copper from the bleed 26. This solvent extraction is associated with the solvent extraction stages 16 and 18 and will be referred to again when the latter two solvent extraction stages are described.

Prior to the pressure oxidation stage 12, the copper concentrate is first subjected to a regrind, as shown at 30, to reduce the particle size to about 97% minus 325 mesh, which corresponds to P80 (80% passing) 15 micron. The regrind 30 is carried out in solution recycled from the bleed treatment 28. Thus, the slurry from the bleed treatment 28 is subjected to a liquid/solid separation, as shown at 32, and the solution is recycled to the regrind 30 and the zinc/magnesium bleed residue is discarded, as shown at 17.

The solution which is recycled to the regrind 30 is an alkaline chloride liquor at about pH 10. Use of this liquor minimizes water input into the pressure oxidation circuit 23 which is important in maintaining heat balance and in preserving the chloride solution in the pressure oxidation circuit 23 as much as possible.

As stated above, copper is not leached in the pressure oxidation stage 12 but is converted to an insoluble basic copper salt. The feed solution to the pressure oxidation stage 12, which is the leach liquor being recycled from the filtration 24 is indicated by reference numeral 25. Although there is copper present in the feed solution 25, there is no additional copper leached, i.e. the process is operated so that the copper concentration in the feed solution 25 to the pressure oxidation stage 12 is equal to the copper concentration in the product solution 21 from the pressure oxidation stage 12. This is indicated as: $\Delta[Cu^{2+}]=0$.

The feed solution 25 to the pressure oxidation stage 12 contains about 15 g/L Cu and 12 g/L Cl, together with about 30–55 g/L sulphuric acid. The acid is added in the form of make up $H_2SO_4$ (usually 93%). The product solution 21 from the pressure oxidation stage 12 also contains about 15 g/L Cu and 11–12 g/L Cl but is at about pH 3. There is substantially no acid left in the product solution 21 as it is all consumed in the pressure oxidation stage 12 to form the basic copper salt.

As referred to above, the liquid feed 25 to the pressure oxidation stage 12 is made up partly of recycled filtrate to which $H_2SO_4$ is added. The immediate effect of adding the acid to the filtrate is to increase the acidity of the filtrate which is fed to the autoclave for the pressure leaching stage 12, but the most important effect, surprisingly, has been found to be that the addition of the acid, or more specifically the sulphate ions, actually suppresses the oxidation of sulphur emanating from the concentrate in the pressure oxidation stage 12.

Typically the oxidation of sulphur that is experienced if no acid is added is about 25–30% of the feed sulphur in the concentrate, as is the case with the process described in U.S. Pat. No. 4,039,406. However, if acid is added, it has been found that the sulphur oxidation to sulphate is reduced to about 5–10%. This improvement has substantial beneficial effects on the hydrometallurgical extraction process. The oxidation of sulphur to sulphate creates additional costs in several ways, such as additional oxygen required for the reaction, additional reagent required to neutralize the acid so formed by the oxidation and provision must be made for heat removal due to the oxidation of sulphur to sulphate which is very exothermic. This actually limits the throughput of the autoclave in which the pressure leaching stage 12 takes place.

The chemistry of the reaction in the pressure oxidation stage 12 is believed to be altered by the addition of the acid as follows:

No acid addition:

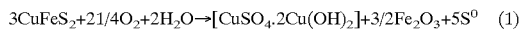

$$3CuFeS_2+21/4O_2+2H_2O \rightarrow [CuSO_4.2Cu(OH)_2]+3/2Fe_2O_3+5S^0 \quad (1)$$

With acid addition:

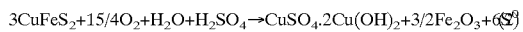

$$3CuFeS_2+15/4O_2+H_2O+H_2SO_4 \rightarrow CuSO_4.2Cu(OH)_2+3/2Fe_2O_3+6S^0 \quad (2)$$

In both reactions, the copper is precipitated in the form of a basic copper salt, which has been found to comprise mostly basic copper sulphate.

In the first reaction it appears that the sulphate of the basic copper sulphate is supplied by oxidation of the feed sulphur in the concentrate, whereas in the second reaction it appears to be supplied by the sulphate ions in the acid which is added to the autoclave, thus obviating the need for the oxidation of sulphur to sulphate. Thus, in the second reaction, there is a net-consumption of sulphate ions to form the basic copper salt. The amount of sulphuric acid needed to suppress sulphur oxidation has been found experimentally to be about 25 to 75 grams per liter, depending on the type of concentrate and the percentage solids in the concentrate.

In actual test work, there is more sulphur oxidation than is predicted by either reaction. The first reaction predicts one sixth or 16.7% of the sulphur to be oxidized, whereas experimentally about 25%–30% is found. With acid addition, experiments indicate that about 2–16% sulphur is oxidized to sulphate, rather than the zero oxidation that would be predicted if the second reaction as written was the only reaction taking place. Therefore, these reaction equations do not reflect exactly what is happening in the pressure leaching stage 12 but are only an approximation.

Chloride is conserved as much as possible in the pressure oxidation circuit 23 but typically about 3–10% chloride is lost per pass into the solid product at the filtration 24. Thus, the chloride must be made up by the addition of HCl or another source of chloride to provide 12 g/L chloride in the feed solution 25. The chloride losses are minimized by thorough washing of the solids from the pressure oxidation stage 12 on the filter 24. The amount of wash water is constrained by the requirement to maintain a water balance in the pressure oxidation circuit 23. The only water loss from the circuit 23 is in the steam 9 from the flashing step 22 and in the filter cake after the filtration 24. Hence, the need to use the recycled solution from the bleed treatment 28 to slurry up the concentrate in the grinding step 30, and thus minimize fresh water input from the concentrate to the pressure oxidation step 12.

It has been found to be advantageous to maintain at least 15 g/L Cu in the product solution 21 from the pressure oxidation stage 12 so as to counteract chloride loss in the form of solid basic copper chloride, $CuCl_2.3Cu(OH)_2$, which can occur if insufficient copper is present in solution to allow basic copper sulphate to form:

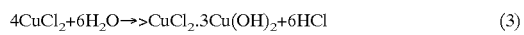

$$4CuCl_2+6H_2O \rightarrow CuCl_2.3Cu(OH)_2+6HCl \quad (3)$$

This reaction can be counteracted by the addition of sufficient acid into the autoclave during the pressure oxidation stage 12 to maintain at least enough copper in solution to satisfy the stoichiometric requirements for Cl as $CuCl_2$. For 12 g/L Cl in solution, the stoichiometric amount of Cu is:

$$\frac{63.5}{71} + 12 = 10.7 \text{ g/L Cu}$$

Thus, 15 g/L Cu is a safe minimum to prevent a significant chloride loss in the form of the basic copper salt.

On the other hand, the copper concentration in the product solution 21 from the pressure oxidation stage 12 should be kept as low as possible to counteract the formation of CuS by the reaction of elemental sulphur with aqueous copper sulphate. This reaction can occur during the pressure oxidation stage 12 or in the slurry after discharge from the autoclave but before the filtration step 24:

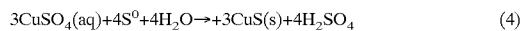

$$3CuSO_4(aq)+4S^0+4H_2O \rightarrow 3CuS(s)+4H_2SO_4 \quad (4)$$

This reaction is particularly undesirable because CuS is insoluble in the dilute acid conditions of the atmospheric leaching stage 14. Thus, the copper is not recovered and this results in the loss of copper to the final residue.

To counteract the formation of CuS it is necessary to keep the copper concentration in the product solution 21 as low as possible, i.e. below 30 g/L for some concentrates. The tendency to CuS formation is apparently related to the type of concentrate being treated, with the medium to high grade concentrates being more susceptible to CuS formation. Thus, although a high copper concentration in the product solution 21 does not present a problem with the low grade concentrates, it cannot be tolerated with the higher grade concentrates.

As is known to date, high grade concentrates, i.e. above 35% copper, are best treated to produce as low a copper concentration in the product solution 21 as possible, i.e. below 25 g/L Cu.

Given the need to maintain at least 15 g/L Cu in solution in the pressure oxidation circuit 23, there is an optimum range of copper concentration of from 15 to 25 g/L Cu for high grade concentrates. With medium grade concentrates, the upper limit can be stretched considerably and for low grade ore, the copper concentration does not play a significant role.

The copper concentration in the pressure oxidation filtrate 29 can be controlled simply by adding the required amount of acid into the feed solution 25 to the pressure oxidation stage 12. More acid results in a higher copper concentration due to the dissolution of the basic copper sulphate:

$$CuSO_4 \cdot 2Cu(OH)_2(s) + 2H_2SO_4 \rightarrow 3CuSO_4(aq) + 4H_2O \quad (5)$$

The addition of about 1 g/L acid results in an increase in copper concentration of about 1 g/L. The actual concentration of acid required is determined empirically by comparing the assays of feed solution 25 to the pressure oxidation stage 12 and the product solution 21 from the pressure oxidation stage 12 to satisfy $\Delta[Cu^{2+}]=0$. The volume of solution in the circuit 23, however, is determined by the heat balance.

The percentage by weight of solids in the feed of copper concentrate slurry to the pressure oxidation stage 12 can be varied at will. The weight of concentrate solid fed to the pressure oxidation stage 12 is determined by the amount of copper to be recovered. The weight of the solution is determined mainly by the heat balance in the pressure oxidation stage 12.

The desired operating temperature in the pressure oxidation stage 12 is about 150° C. and the heat must be supplied largely by the heat of reaction of the sulphide minerals with the high pressure oxygen in the autoclave. For high grade concentrates, such as will be treated by the Process Mode A currently being described, this means a relatively low S/Cu ratio and thus a smaller heat production per tonne of copper treated in the autoclave. Much of the heat evolved is due to oxidation, not of copper, but of the other two main elements in the concentrate, iron and sulphur. If the grade of the concentrate is high, then the ratio of S/Cu and Fe/Cu is low, hence a lower heat production.

To reach operating temperature from a starting temperature of say 50° to 80° C., which is typical for the pressure oxidation filtrate 29 which is recycled after the filtration 24, it is necessary to control the amount of water that must be heated, since this is the main heat sink in the pressure oxidation stage 12. It is impractical to cool or heat the slurry inside the autoclave by indirect means, such as by means of heating or cooling coils, because of rapid scale formation on all surfaces, particularly heat exchangers, leading to very poor heat transfer characteristics. Direct heating or cooling by injection of steam or water is also impractical due to water balance considerations. Therefore, it is required that the heat balance be maintained by balancing heat production from reaction heat with the heat capacity of the feed materials, i.e. the feed solution 25 being recycled and the concentrate slurry. The main variable that can be controlled here is the volume of the feed solution 25. This is one of the distinguishing features between Modes A and B. In Process Mode B, still to be described, where greater sulphur oxidation is experienced, the heat evolution is much greater, expressed as heat per tonne of copper product. Therefore, it is possible to use more solution volume in the feed 25 to the pressure oxidation stage 12.

Once the solution volume is fixed, the acidity of the solution can be determined, since the total mass of acid is determined by the need to maintain $\Delta[Cu^{2+}]=0$. Typically, for a high grade concentrate, about 35–55 g/L acid will be required.

It has been found to be beneficial to add small concentrations of certain surfactants which change the physical and chemical characteristics of liquid elemental sulphur (S°) in the autoclave during the pressure oxidation stage 12. Surfactants such as lignin sulphonate and quebracho added to the pressure oxidation feed solution 25 in small amounts, i.e. 0.1 to 3 g/L can reduce the viscosity of the liquid sulphur and also change the chemistry in the autoclave.

Additions of surfactants can reduce sulphur oxidation in ways that are not well understood, but are beneficial to the process. It is believed that this is due to lower viscosity, resulting in lowered tendency for liquid sulphur and solids to be held up within the autoclave, thus reducing the retention time for these materials, and hence the reduced tendency for sulphur oxidation to occur.

Also it has been found that more complete reaction of the copper minerals takes place if surfactants are added, apparently because of lower viscosity sulphur, which does not "wet" unreacted sulphide minerals, and thus allows the desired reaction to proceed to completion.

Reaction (5) describes how adding sulphuric acid to the pressure oxidation feed 25 will control the copper concentration in the pressure oxidation filtrate 29. The overall reaction for the pressure oxidation with sulphuric acid addition for a chalcopyrite ore is given by reaction (2) above.

A similar reaction can be written using $CuSO_4$ as the source of sulphide ions instead of $H_2SO_4$:

$$3CuFeS_2 + 15/4 O_2 + 3H_2O + 3/2 CuSO_4 \rightarrow 3/2 CuSO_4 \cdot 2Cu(OH)_2 + 3/2 Fe_2O_3 + 6S° \quad (6)$$

It is noteworthy that there are 3/2 moles of sulphate required as copper sulphate in reaction (6) compared to one mole of sulphuric acid in reaction (2). Therefore, if $CuSO_4$ is to be used as the source of sulphate ions instead of sulphuric acid, it is necessary to use 1.5 times as many moles of $CuSO_4$. To take this into account, the inventor has developed the concept of Excess Sulphate Equivalent, which allows the calculation of how much acid to add to the pressure oxidation feed solution 25 in order to achieve a target copper concentration and still take into account reaction (6).

By taking reaction (6) into account, it is possible to calculate "a priori" the amount of acid required for constant copper concentration in the pressure oxidation filtrate 29. The concept of Excess Sulphate Equivalent is helpful:

Excess Sulphate Equivalent is equal to the sulphate available in the pressure oxidation feed solution 25 for formation of basic copper sulphate during the pressure oxidation stage 12. The sulphate available is that which is in excess of a defined Base Level of $CuSO_4$ and $CuCl_2$.

Base Level of $CuSO_4$ and $CuCl_2$ is sufficient to support chloride in solution at 12 g/L in the form of $CuCl_2$ and, in addition, about 4.3 g/L Cu as $CuSO_4$. The concentration of $CuCl_2$ corresponding to 12 g/L chloride in solution is 134.5/71*12=22.7 g/L $CuCl_2$, which contains 10.7 g/L Cu in solution. The additional 4.3 g/L copper therefore means a total of 15 g/L copper combined as $CuCl_2$ and $CuSO_4$ in the Base Level.

Sulphate available is then the total sulphate as $CuSO_4$ less the Base Level. For instance, if the total copper concentration is 28 g/L in the pressure oxidation filtrate 29, then the sulphate available is 28−15=13 g/L Cu * 98/63.5=20 g/L $H_2SO_4$ as available sulphate from $CuSO_4$.

Excess Sulphate Equivalent (ESE) is then calculated from the available sulphate from $CuSO_4$ by dividing by 1.5:

$$ESE = \{\text{Available Sulphate as } CuSO_4\}/1.5$$

Thus, in the example of 28 g/L total copper concentration or 20 g/L available sulphate from $CuSO_4$, there is 20/1.5= 13.3 g/L ESE from $CuSO_4$.

Finally, if the target free acid equivalent is, say, 52 g/L $H_2SO_4$ in the pressure oxidation feed solution 25, then the amount of acid required is 52 less the ESE (13.3 g/L) or 38.7 g/L $H_2SO_4$. This is the amount that must be added to the feed solution 25 to the pressure oxidation stage 12 to produce a constant copper concentration in the pressure oxidation filtrate 29, i.e. the Base Level of 15 g/L Cu.

Other reactions can be written using $Fe_2(SO_4)_3$ and $ZnSO_4$ as the source of sulphate ions instead of $H_2SO_4$. In the case of $ZnSO_4$, the zinc is assumed to hydrolyze to basic zinc sulphate, $ZnSO_4.3Zn(OH)_2$, which is a basic salt of Zn analogous to basic copper sulphate. These reactions are given below as reactions (7) and (8).

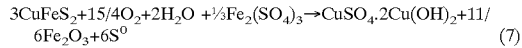

$$3CuFeS_2 + 15/4 O_2 + 2H_2O + \tfrac{1}{3}Fe_2(SO_4)_3 \rightarrow CuSO_4.2Cu(OH)_2 + 11/6 Fe_2O_3 + 6S^o \qquad (7)$$

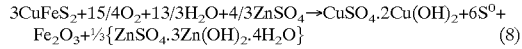

$$3CuFeS_2 + 15/4 O_2 + 13/3 H_2O + 4/3 ZnSO_4 \rightarrow CuSO_4.2Cu(OH)_2 + 6S^o + Fe_2O_3 + \tfrac{1}{3}\{ZnSO_4.3Zn(OH)_2.4H_2O\} \qquad (8)$$

The solids from the pressure oxidation stage 12 after the filtration 24, are treated in the atmospheric leaching stage 14 at about pH 1.5 to pH 2.0 using raffinate from the primary solvent extraction stage 16, which is acidic, to dissolve the basic copper sulphate. The leaching 14 takes place at a temperature of about 40° C. for a retention time of about 15–60 minutes. The percentage solids is typically about 5–15% or about 50–170 g/L, although it is possible to operate the process outside this range.

During the atmospheric leaching stage 14, the basic copper salts dissolve almost completely with very little of the iron present in the concentrate going into solution.

Typically, the leach liquor 33 produced after the liquid/solid separation 34 contains about 10–20 grams per liter copper, depending on the percentage solids feed to the leach 14, with 0.1–1.0 g/L iron and about 0.1–1.0 g/L chloride. Much of this iron and chloride are derived from the feed raffinate 37 rather than the solids from pressure oxidation, i.e. they are recycled. Typically about 0.1–0.2 g/L iron and chloride dissolve per pass.

The copper extraction has been found to be about 95–98% based on the original feed to the pressure leaching stage 12. Iron extraction to solution has been found to be less than about 1%.

The slurry 31 from the atmospheric leaching stage 14 is difficult if not impossible to filter, but settles well. In view of the need to wash the leach solids very thoroughly, the slurry 31 is therefore pumped to a counter current decantation (CCD) wash circuit, symbolically indicated as a solid/liquid separation 34 in FIG. 1. In the CCD circuit 34, the solids are fed through a series of thickeners with wash water added in the opposite direction. By this method, the solids are washed and entrained solution removed. About 3 to 5 thickeners (not shown) are required with a wash ratio (water to solids) of about 5 to 7 to reduce entrained liquor down to less than 100 ppm Cu in the final residue.

The thickener underflow from the last thickener is the final residue stream 35 at about 50% solids. This can be treated for the recovery of precious metals, such as gold and silver, or sent to tailings. The recovery of precious metals will be described later on with reference to FIG. 5.

The main constituents of the stream 35 are hematite and elemental sulphur, which may be recovered by flotation if market conditions warrant.

The thickener overflow from the first thickener is the product solution 33 which is fed to the primary solvent extraction stage 16, as shown. As an example, this solution contains about 12 g/L Cu, 1 g/L Cl and 0.5 g/L Fe.

The optimum copper concentration is determined by the ability of the solvent extraction stage 16 to extract the maximum copper from the solution 33. Since a fraction of about one-third of the raffinate from the solvent extraction stage 16 is eventually neutralized, it is important to minimize the copper content of this raffinate.

Solvent extraction performs best on dilute copper solutions due to the fact that a concentrated copper solution results in a higher acid concentration in the raffinate which tends to lower extraction efficiency. More concentrated solutions are, however, cheaper to treat from a capital cost point of view, since the volume is less. Above a certain point, though, the increased concentration does not reduce the size of the solvent extraction unit, since (i) there is a maximum organic loading and (ii) aqueous volume is generally kept equal to organic volume for mixing purposes by means of aqueous recycle. Therefore, the total volume of organic extractant and aqueous solution is only determined by the volume of organic extractant. The maximum organic loading and hence volume of organic is determined by the concentration and characteristics of the particular organic solvent selected. For the typical solvent, e.g. an hydroxy-oxime, the maximum loading per pass at 40% volume concentration in diluent is about 12 g/L Cu. Therefore, the product solution 33 also should contain about 12 g/L Cu.

The copper is extracted from the product solution 33 from the CCD thickener overflow in two stages of extraction in the primary solvent extraction stage 16 to produce a raffinate 37 with about 20 g/L free acid and about 0.3 to 1 g/L Cu. Most of this raffinate 37 is recycled to the atmospheric leaching stage 14 but about 25 to 30% is surplus to the acid requirements of the atmospheric leaching stage 14 and must be neutralized. This surplus 121 is split off as shown at 36 and neutralized.

The neutralization is effected in two stages to maximize copper recovery and to prevent possible environmental problems with the neutralization residue due to copper content, i.e. the unrecovered copper from the raffinate 37 will precipitate upon neutralization and can then re-dissolve later, in a tailing pond, for example.

The first stage neutralization takes place at pH 2 to pH 3, as shown at 38, using limerock, which is very economical as a reagent, compared with lime. The neutralization product is filtered at 40 and the resultant solids are washed with water from the external source 45. The solids, which are mainly gypsum and iron hydroxides, are discarded, as shown at 41.

The filtrate 39 is sent to the secondary solvent extraction stage 18 for the recovery of residual copper values. The secondary solvent extraction 18 benefits from the primary neutralization 38 and results in a very low copper concentration in the secondary raffinate 43, typically from about 0.03 to 0.06 g/L Cu.

As indicated by the broken lines in FIG. 1, the secondary solvent extraction stage 18 uses the same organic extractant as the primary solvent extraction circuit 16. This is also tied in with the solvent extraction 27 of the pressure oxidation filtrate bleed 26. The organic extractant which is washed at 42 with wash water 122 from an external source 45, and stripped at 44 is recycled to the secondary solvent extraction stage 18 and then passes to the primary extraction stage 16. The stripped organic 125 is split to pass a portion thereof to the solvent extraction 27. The raffinate from the solvent extraction 27 is added to the loaded organic 123 from the solvent extraction 16 prior to the wash 42. The wash water 47 from the wash 42 is passed to the pressure oxidation filter 24, to serve as a feed wash water onto the filter 24. The resultant wash filtrate is added to the pressure oxidation filtrate 29, thus recovering the copper and chloride content from the solvent extraction wash water 47.

The raffinate 43 from the secondary solvent extraction stage 18 is neutralized again in a secondary neutralization stage 46, this time at pH 10 and filtered at 48 to remove all dissolved heavy metals, producing a solution 51 which is used as wash water in the CCD circuit 34 for washing the final leach residue 35. The solid residue from the filtration 48 is discarded, as shown at 53.

Stripping of the loaded and washed organic at 44 is effected by means of spent acid or electrolyte 55 from the electrowinning stage 20 to obtain a pure copper sulphate solution or pregnant electrolyte 57 which is then passed to the electrowinning stage 20 for electrowinning in the usual way.

It can be seen that all solution streams in the process are thus recycled and there are no solution effluents from the process. Only solid residues are discarded from the process.

Process Mode B

Figure 2:
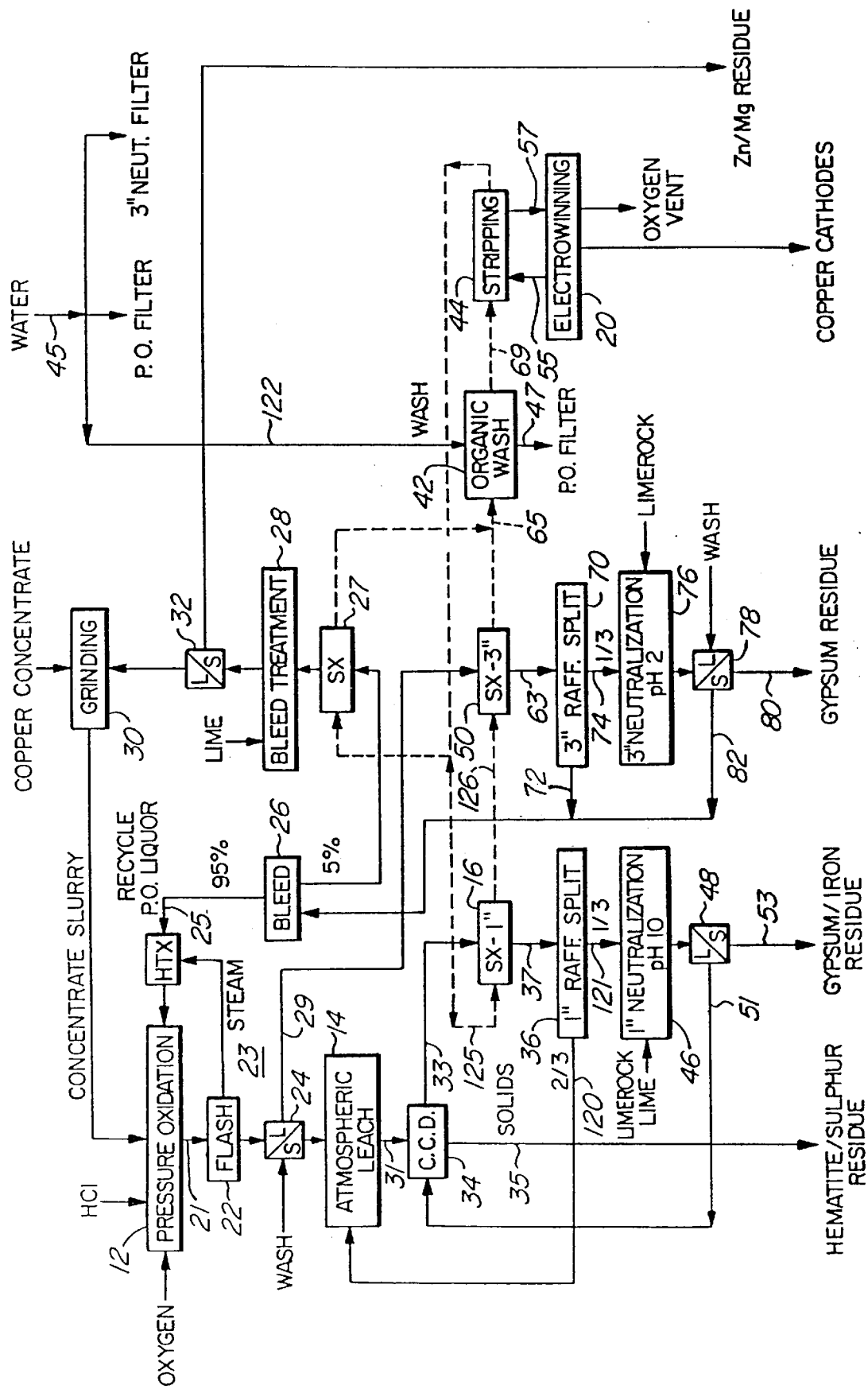
FIG. 2 is a flow diagram of a hydrometallurgical copper extraction process according to another embodiment of the invention, which is suitable for the treatment of medium and lower grade copper ores or concentrates.

FIG. 2 is a flow diagram of Mode B. The same reference numerals are used to indicate stages or steps in the process which correspond with those in the previous embodiment of FIG. 1. For example, the pressure oxidation stage is again indicated by 12, the atmospheric leach stage by 14, the electrowinning stage by 20, the flash tank(s) by 22, the pressure oxidation filtration by 24, the bleed treatment of the pressure oxidation filtrate 29 by reference numeral 28, the grinding stage by reference numeral 30 and the CCD wash circuit by reference numeral 34.

In this mode of the process, the pressure oxidation 12 is carried out both to oxidize and to leach into solution most of the copper contained in the feed concentrate. Typically about 85–90% of the copper is leached into the solution, with only about 10–15% being left in the residue as the basic copper sulphate.

The conditions of the pressure oxidation stage 12 in the autoclave are similar to those in Process Mode A except that the percentage solids is lower, i.e. 150–225 g/L.

In this mode of the process, $\Delta[Cu^{2+}]$ is typically 30 to 40 g/L Cu, i.e. the copper concentration is greater in the product solution 21 from the pressure oxidation stage 12. The feed solution 25 to the pressure oxidation stage 12 typically contains 10–15 g/L Cu and 12 g/L Cl, together with about 20 to 30 g/L sulphuric acid.

In this mode, no sulphuric acid is added to the pressure oxidation stage 12 from an external source, as is the case with the FIG. 1 embodiment. In this mode, the acid is obtained from recycle in the process, i.e. by the recycle of the pressure oxidation filtrate 29. The product solution 21 from the pressure oxidation stage 12 contains about 40 to 50 g/L Cu and 11 to 12 g/L Cl at about pH 2 to 2.5.

The copper leached into the product liquor 21 from pressure oxidation stage 12 must be controlled so as to obtain the desired distribution of copper between liquor (85 to 90%) and residue (10 to 15%). This distribution results in a small but important amount of basic copper sulphate solids in the leach residue. The pH is a convenient indicator of the presence of basic copper sulphate, since it is a buffering agent. With strong copper sulphate concentration in solution, a pH range of 2 to 2.5 indicates basic copper sulphate. Below pH 2 almost all the basic copper sulphate will be dissolved, whereas above pH 2.5, too much basic copper sulphate is formed and insufficient copper is likely to be found in the solution 21.

The primary method of control is the amount of acid in the feed liquor 25 to the pressure oxidation stage 12. The acid level in turn is controlled by the degree of neutralization of the raffinate from solvent extraction of the pressure oxidation filtrate 29 raffinate described below. Usually, about 25 to 50% of the acid must be neutralized, depending on the amount of acid that is required.

The acid generated during the pressure oxidation stage 12 varies from one concentrate to another and according to conditions employed. If the concentrate produces a large amount of acid during the pressure oxidation stage 12, then the feed solution 25 will need less acid to achieve the desired result. The minimum copper (from concentrate feed) that should go to liquor 21 is about 10%. Below 10%, the pH drops sufficiently low so that iron concentrations in the pressure oxidation filtrate 29 increase rapidly. Normally, iron is about 10 to 50 ppm, but if pH is below 2 and basic copper sulphate in residue disappears, then iron can increase to above 1 g/L fairly quickly. This is undesirable because there are several impurity elements such as As and Sb which are only removed from solution simultaneously with iron hydrolysis. Therefore, absence of iron in solution is a good guarantee of low impurity content in the pressure oxidation filtrate 29. Iron is also an impurity itself that must be avoided in the electrowinning circuit 20 as far as possible.

There is another factor, however, which places a maximum on Cu in solution. It has been found surprisingly that certain concentrates actually leach more completely if the copper concentration is lower. This is believed to be due to either formation of secondary CuS, as described above, or to some other phenomenon related to poor oxidation characteristics of the primary mineral, chalcopyrite, in high copper concentration solutions. It is found that elemental sulphur, produced during the reaction in the pressure oxidation stage 12, can coat or actually encapsulate unreacted chalcopyrite particles and hinder the access of reagents. This results in poor copper recovery. The phenomenon is apparently accentuated by high Cu levels in solution. It can be overcome or mitigated by the use of surfactants, as described above. The problem is more severe with some concentrates, particularly high grade, than others. Therefore, for these concentrates it is desirable to limit the copper concentration in the pressure oxidation filtrate (i.e. greater than about 95%) over all. To do this, it is necessary to have a substantial proportion of the copper as basic copper sulphate, i.e. in solid residue from the pressure oxidation stage 12 rather than the pressure oxidation filtrate. Typically, 20–40% of copper may report to solids, if necessary, to keep the copper concentration low enough to obtain high copper recovery.

Higher grade concentrates exhibit the problem of low copper recovery with high copper in solution. Therefore, an increasing proportion of copper must report to solids as the grade increases. Tests with three different concentrates illustrate this relationship:

| Conc. # | % Cu | H⁺/Cu Molar | Cu Distribution % PO liquor | Cu Distribution % PO residue | Total recovered |
|---|---|---|---|---|---|
| 1 | 41 | 0.55 | 0 | 100 | 97.3 |
| 2 | 28 | 0.70 | 63 | 37 | 95.7 |
| 3 | 22 | 0.96 | 85 | 15 | 94.7 |

The H⁺/Cu molar ratio refers to H⁺ in the feed acid and Cu in the feed concentrate. The H⁺ in the feed acid is taken to be all the protons available on complete dissociation of the acid even if under existing conditions the acid is not completely dissociated. The H⁺ shown in the table is optimum level found by experiment to give the best results.

For concentrate #1, which was a high grade concentrate, the process chosen is Mode A, where all of the copper reports to the leach liquor 33 and $\Delta[Cu^{2+}]=0$. The H⁺/Cu ratio is that found which was necessary by experimentation to give the desired result of $\Delta[Cu^{2+}]=0$.

For concentrate #2, a medium grade concentrate, Mode B was chosen, but with a substantial amount of the copper reporting to the solid basic copper sulphate. This was achieved by keeping the H⁺/Cu ratio low enough so that not all of the copper dissolved into the liquor.

For concentrate #3, a low grade concentrate, Mode B was also chosen but in this case, the minimum amount of copper reported to the residue, by adjusting the H⁺/Cu ratio to be high enough.

The residue from the pressure oxidation stage 12 is leached 14 with raffinate 37 returning from the solvent extraction 16 which is dilute acid, at 3–10 g/L H₂SO₄. Since most of the copper from the pressure oxidation stage 12 reports to the pressure oxidation filtrate 29 and only a small fraction of the pressure oxidation residue, the resultant leach liquor 31 from the atmospheric leach 14 is quite dilute in copper. In turn, this produces a dilute raffinate 37 from the solvent extraction 16. Typically, the atmospheric leach liquor 31 is 3–7 g/L Cu and 0.2 to 0.5 g/L Fe.

The slurry resulting from the atmospheric leaching stage 14 is difficult to filter, as was the case with Mode A. Good liquid/solid separation and washing, however, can be achieved as before using a series of thickeners in a CCD arrangement 34. Wash water 51 is provided by raffinate from the solvent extraction 16, which is neutralized, as indicated at 46. This is similar as in Mode A. The only major difference is the lower tenor of the solution 33 and the reduced volume.

The solution 33 produced by the atmospheric leaching stage 14 is subjected to the solvent extraction 16. The copper containing solution 29 from the pressure oxidation stage 12, is subject to a solvent extraction stage 50. There are, therefore, two solvent extraction operations, i.e. 16 and 50, treating two different streams of liquor 33 and 29, respectively. It is a feature of the process according to the invention that the organic extractant used for effecting the solvent extraction operations is common to both solvent extractions 16 and 50.

As shown in FIG. 2, the stripped organic 125 coming from the common stripping operation 44 is first introduced into the solvent extraction circuit 16, which has the weakest copper concentration in the aqueous feed stream 33 and therefore needs the organic extractant to be as low as possible in loading to be effective.

The loaded organic 126 from solvent extraction 16 is then sent to the solvent extraction 50 where it contacts the higher copper concentration liquor 29. It is not necessary for the solvent extraction 50 to achieve a high extraction ratio because the raffinate 63 from this extraction is recycled to the pressure oxidation stage 12, as shown. On the other hand, the raffinate 37 from the solvent extraction 16 is only partly recycled and part is neutralized 46 to remove excess acid from the circuit. Therefore, it is more important to achieve high copper recovery from the solvent extraction 16.

The raffinate 37 from the solvent extraction 16 is split at 36 as in Mode A, with about one-third 121 to the neutralization 46 and two-thirds 120 recycled to the atmospheric leach stage 14. An important difference from Mode A is that the raffinate 37 from solvent extraction 16 is sufficiently low in copper, i.e. below 100 ppm, so that it is not necessary to have a secondary solvent extraction stage before neutralization 46, as was the case in Mode A. This is due to the lower copper concentration and solution volume, allowing the solvent extraction 16 to be more efficient.

The loaded organic 65 produced by the two solvent extraction operations 16, 50 in series, is washed in two stages in counter current fashion with dilute acidic aqueous solution 122, as shown at 42. This is primarily to remove entrained aqueous solution from the loaded organic 65 and in particular to reduce the chloride content before the organic goes to stripping at 44. The amount of wash water required is about 1–3% of the organic volume. The resultant wash liquor 47 produced is recycled to the pressure oxidation stage 12.

The washed organic 69 is stripped at 44 with spent electrolyte 55 from the electrowinning stage 20 to provide a pure copper solution or pregnant electrolyte 57 for electrowinning in the usual way.

The raffinate 63 is split at 70 in two portions 72, 74 as determined by the required molar ratio of H⁺/Cu. The portion 72 is recycled to the pressure oxidation stage 12. The portion 74 is neutralized at pH 2 with limerock at 76 and filtered 78. The solid residue is washed and discarded, as shown at 80. The filtrate 82 is recycled with the portion 72 to form the feed solution 25 to the pressure oxidation stage 12.

A novel feature of the process, therefore, is the use of a common organic to extract copper from two separate aqueous feed liquors. This provides considerable economies in lower capital and operating costs in the solvent extraction circuits. Also, it allows for the use of copious amounts of water in the atmospheric leaching CCD circuit, so that good washing can be achieved on the final residue and yet still recover copper from such a dilute liquor.

It has been found that the degree of sulphur oxidation that occurs in the pressure oxidation stage 12 is highly dependent on the type of concentrate, such as grade and mineralogy of the concentrate being treated, as well as the conditions of the pressure oxidation stage 12. Certain concentrates exhibit considerably higher sulphur oxidation, e.g. 25–30%, i.e. oxidation of the sulphur in the concentrate to sulphate, and the effect is particularly marked with the low grade concentrates with less than about 28% Cu by weight. The inventor has found that the significance of this variation is not so much the copper grade itself but the copper/sulphur ratio in the concentrate. The main impurity elements in a copper concentrate are iron and sulphur due to the fact that copper ores are generally composed of chalcopyrite together with other minerals, particularly pyrite $FeS_2$ or pyrrholite $FeS$.

Process Mode B deals with the problem of excess sulphur oxidation in the pressure oxidation stage 12 when lower grade concentrates are used by deliberately dissolving 90% of the copper and minimizing the formation of basic copper sulphate. The reaction for chalcopyrite is:

$$CuFeS_2 + 5/4 O_2 + H_2SO_4 + CUSO_4 + \tfrac{1}{2}Fe_2O_3 + 2S^0 + H_2O \qquad (9)$$

The filtrate 29 from the pressure oxidation stage 12 thus contains high levels of copper sulphate and copper chloride and this is treated in the solvent extraction stage 50 to produce a pure copper sulphate solution which goes to the electrowinning stage 20.

It has been found that there is a limit to the amount of sulphur oxidation that can be accommodated by the process Mode B. If the sulphur oxidation is high enough and sufficient acid is generated during pressure oxidation, there will be a surplus of acid left over after pressure oxidation, even if no acid is added to the feed, such as in the form of acidic raffinate. In this situation, not only will all the copper in the concentrate be converted to dissolved copper sulphate, but also some of the iron in the concentrate will be solubilized by the surplus acid, e.g. as ferric sulphate.

It is desirable that iron in the concentrate report to the pressure oxidation residue as stable hematite, $Fe_2O_3$, and not to the solution, where it must be separated from the copper. Typical concentrates have an Fe:Cu ratio of at least 1:1, and therefore the efficient and complete elimination of Fe at an early stage is an important aspect of the process. Other impurities such as arsenic, antimony, etc., are also removed with iron by co-adsorption or precipitation mechanisms.

It has been found that some concentrates, however, exhibit so much sulphur oxidation (acid generation) that the acid-consuming capacity of pressure oxidation is exceeded, and some iron is leached into solution, even under process Mode B conditions. It is a target of the process to produce a low-iron liquor, typically with 0.05 g/L Fe. Some concentrates which have been tested have produced pressure oxidation liquors with 1.0 to 12.0 g/L Fe. Similarly the pH of the pressure oxidation liquor is normally targeted to be in the range 2.0 to 3.5, corresponding to less than 1 g/L free acid, but concentrates tested have produced pressure oxidation liquors with pH in the range 1.2–2.0, corresponding to 1 to 15 g/L free acid.

Accordingly, a further embodiment of the process has been developed, i.e. process Mode C for the treatment of the above concentrates, termed "Mode C" concentrates. Process Mode C will now be described below.

Process Mode C

The Mode C concentrates that exhibit a strong tendency towards sulphur oxidation and hence acid generation are those with a high S:Cu ratio, or more generally S:M ratio, where M=base metals, such as Cu, Zn, Ni, Co, Pb, etc., but not including Fe, which does not consume acid.

Nickel or nickel/copper concentrates may often be Mode C, because they are frequently low-grade, with S:M ratio often about 2:1 or higher. Some copper or copper/gold concentrates are also Mode C, if they are low grade because of high pyrite content. Some copper/zinc concentrates have also been found to be high in pyrite and hence of Mode C type as well.

In general there is a correlation between pyrite ($FeS_2$) content and the tendency toward Mode C type behaviour. However, there are also exceptions to this trend, as not all pyrites react in the same way. Some pyrites oxidize sulphur more readily than others. In contrast, pyrrhotite ($Fe_7S_8$) or the related iron-zinc mineral sphalerite, $(Zn,Fe)S$, appear to result in much less sulphur oxidation, and thus exhibit Process Mode A or B behaviour.

In this process mode the objective, as with Modes A and B, is to reduce sulphur oxidation during pressure oxidation by the addition of sulphate or sulphuric acid. The pressure oxidation filtrate resulting from the high acid concentration will have high levels of dissolved iron and low levels of dissolved copper. Therefore, a neutralizing agent, such as lime or limestone, is added to neutralize the pressure oxidation slurry prior to filtration.

Process Mode C is essentially a special case of Process Mode B, with two important differences.

First, all the raffinate 63 (FIG. 2) is neutralized, before returning this stream to the pressure oxidation 12, i.e. there is no raffinate split, with one part being neutralized and the other part by-passing the neutralization.

Secondly, the pressure oxidation slurry before filtration 24 of the leach residue is subjected to an extra neutralization step, the "pressure oxidation neutralization", to neutralize excess acid and precipitate any Fe in solution at this time.

A convenient opportunity for the pressure oxidation neutralization is in a conditioning tank after flash let-down 22 to atmospheric pressure, when the slurry is at or near the boiling point of the solution, i.e. about 80°–95° C.

However, there is an inherent problem with this, i.e. the unwanted formation of gypsum deposits in subsequent unit operations downstream from the neutralization, where the temperatures are lower. The gypsum deposits because the solubility of calcium sulphate is lower, causing the supersaturation of calcium sulphate once the temperature is reduced.

If the above-described neutralization is carried out on a slurry at 80°–95° C., using limerock, then the resulting solution will be saturated with calcium sulphate at that temperature. If the resulting solution is subsequently cooled to 40°–50° C. for solvent extraction, then the solubility of calcium sulphate is markedly reduced and consequently there will be slow precipitation of solid calcium sulphate, most likely the dihydrate form known as gypsum, $CaSO_4 \cdot 2H_2O$. Such gypsum is well known to form tenacious scale in piping, valves, tanks, etc. and cause severe operational problems in a commercial plant.

This problem has been solved by carrying out the neutralization inside the autoclave or pressure vessel 300 (FIG. 3), at the conclusion of the pressure oxidation stage 12, when the temperature is about 115° to 160° C. It has been found that in this temperature range, the solubility of calcium sulphate is equal to or lower than at the lower temperatures, where solvent extraction takes place. Thus the saturation level for calcium sulphate produced during the neutralization is equal to or lower than at any subsequent stage in the process, and supersaturation does not occur due to a temperature drop. In this way, gypsum scaling problems are avoided.

The pressure vessel 300 in the present example has five compartments 302.

Figure 3:
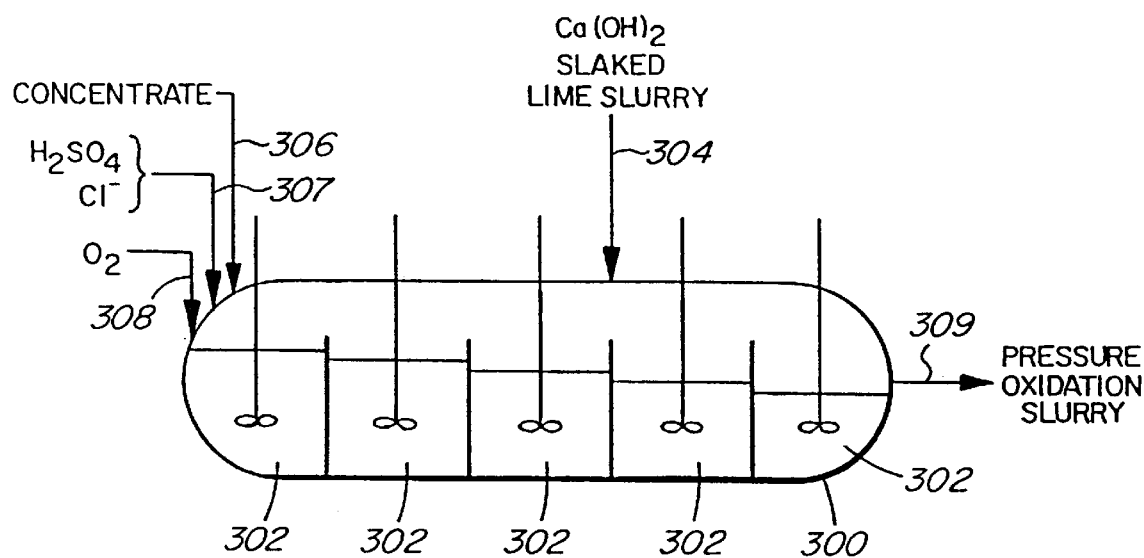
FIG. 3 is a schematical illustration of a pressure vessel to illustrate another embodiment of the process for the treatment of concentrates with a high sulphur to metal ratio.

To achieve the neutralization inside the pressure vessel 300, it has been found preferable to use slaked lime slurry, $Ca(OH)_2$, rather than limerock, $CaCO_3$, as the active neutralizing agent as indicated at 304 in FIG. 3. Slaked lime avoids the formation of carbon dioxide gas, $CO_2$, which is attendant upon the reaction of limerock with acid. $CO_2$ gas occupies a large volume of space within the pressure vessel 300, otherwise needed for oxygen, and effectively shuts down the desired pressure oxidation reaction. To use slaked lime in a continuous reaction vessel, it is necessary to pump it into the pressure vessel 300 in the customary slurry form at 10–20% solids in water, into the latter compartments 302 of the vessel 300. Thus it is beneficial to carry out the pressure oxidation in the first three or four compartments 302, and pump in the slaked lime slurry to the last or last but one compartment 302. The concentrate, $H_2SO_4$, chloride and oxygen are introduced into the autoclave 300, as indicated at 306, 307 and 308, respectively.

The amount of slaked lime to be used is determined by the amount of acid and iron to be neutralized and the amount of copper that may be needed to be precipitated in the form of basic copper sulphate. Generally it is desirable to finish pressure oxidation 12 with no free acid and virtually no iron in solution, i.e. less than 10 ppm Fe, and a pH of about 2.5 to 4.0.

As already indicated above, it is important to keep the addition of water to the system to a minimum. This also applies to the pressure oxidation neutralization using $Ca(OH)_2$ (slaked lime). Normally a solid's content of about 10–20% is the maximum that can be tolerated before the viscosity of the slaked lime slurry becomes too difficult to handle. This is particularly a problem when Ni is present in the concentrate where the consumption of $Ca(OH)_2$ is high. This problem can be overcome by the addition of a viscosity modifier, such as caustic, potash or lignosol. This effectively reduces the viscosity so that a 30% or higher solids content can be tolerated.

The resultant slurry (indicated at 309), now at pH 2.5 to 4.0 is flashed in two stages to atmospheric pressure and then filtered (24) (FIG. 2). The filter cake is washed to remove entrained liquor (Cu,Cl) as much as practical. The filter cake now containing solid calcium sulphate, produced at the pressure oxidation temperature, together with other solids, such as hematite, elemental sulphur and basic copper sulphate proceeds to atmospheric leaching 14 where any precipitated copper is leached as usual at about pH 1.5–1.8, and the resultant residue washed thoroughly in the CCD circuit 34. The filtrate 29 from the pressure oxidation filtration is treated as in process Mode B for Cu removal by the solvent extraction stage 50, producing a raffinate 63 that then goes to neutralization 76, as before, and then recycled back to the pressure oxidation 12, but without the raffinate split 70, as indicated above.

Although the pressure oxidation stage 12 is chloride catalyzed, it does not use a strong chloride solution, e.g., in the preferred embodiment only about 12 g/L is needed which will support about 11 g/L Cu or Zn as the respective chloride salt. If a higher concentration of metals is needed or produced, it is as the sulphate salt. Thus, the solutions produced by the pressure oxidation stage 12 are generally mixtures of the sulphate and chloride salts, not pure chlorides.

Tests were carried out on a low grade sulphide ore to investigate the effect of the pressure oxidation neutralization.

In a first test, which was operated according to Mode B with no neutralization, the feed to the autoclave comprised 10.7 g/l free acid, 12 g/l Cu and 12.5 g/l chloride in solution. The resultant pressure oxidation filtrate 29 after filtration was at a pH of 1.72 with a copper concentration of 48 g/l and dissolved iron present in an amount of 2350 ppm. The solid residue sent to the atmospheric leach 14 contained 2.0% Cu.

In a second test, on the same low grade concentrate, which was operated according to Mode C with a neutralization step in the autoclave, the feed to the autoclave comprised 16.0 g/l free acid, 14 g/l Cu and 12 g/l chloride in solution. The resultant pressure oxidation filtrate 29 was at a pH of 3.05 with a copper concentration of 42 g/l and only 25 ppm iron in solution. The solid residue contained 6.5% Cu. No problem with gypsum precipitation later on in the lower temperature stages of the process was encountered.

In both tests the sulphur oxidation, i.e. oxidation of the sulphur in the concentrate to sulphate, was about 27–30%.

These tests illustrate that it is possible to control pH by neutralization in the autoclave, thereby minimizing the iron content in the pressure oxidation filtrate, without the problem of gypsum precipitation in the system.

Figure 4:
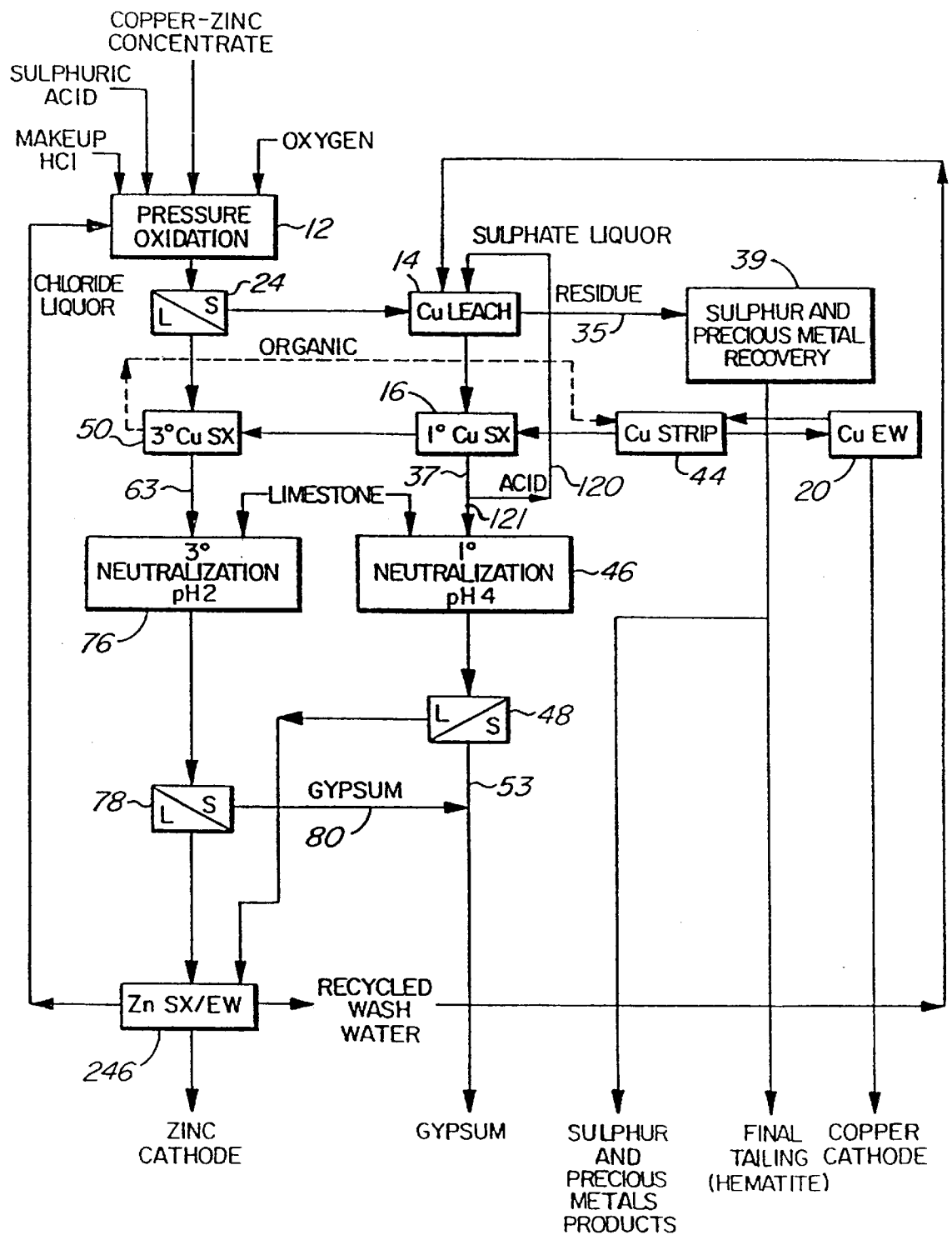
FIG. 4 is a flow diagram of a hydrometallurgical process for the extraction of metals from a copper-zinc sulphide concentrate according to another embodiment of the invention.

Referring to FIG. 4, an embodiment of the process which is suitable for the treatment of copper-zinc concentrates with about 20–25% Cu and about 1–10% Zn is shown. The process is similar to the process Mode B of FIG. 2 and like reference numerals are again used to indicate corresponding steps. FIG. 4 is less detailed than FIG. 2.

It has been found that good extraction of Zn in the pressure oxidation stage 12 can be achieved if sufficient acid is added to the feed solution to maintain the final pH of the slurry below about pH 2. Otherwise, the conditions are similar as for Cu concentrates being treated by the FIG. 2 process, i.e., 150° C., 200 psig (1400 kPa) $O_2$, 12 g/L Cl.

In the Mode B type process, Cu is primarily solubilized during the pressure oxidation stage 12, and is extracted by the Cu solvent extraction 50. This solvent extraction stage 50 is operated in conjunction with the Cu solvent extraction stage 16 in which Cu is extracted from the leach liquor coming from atmospheric leach stage 14, as described with reference to FIG. 2 above. The solvent extractions 50, 16 produce a concentrated copper solution which is treated in an electrowinning stage 20, as described above.

Figure 5A:
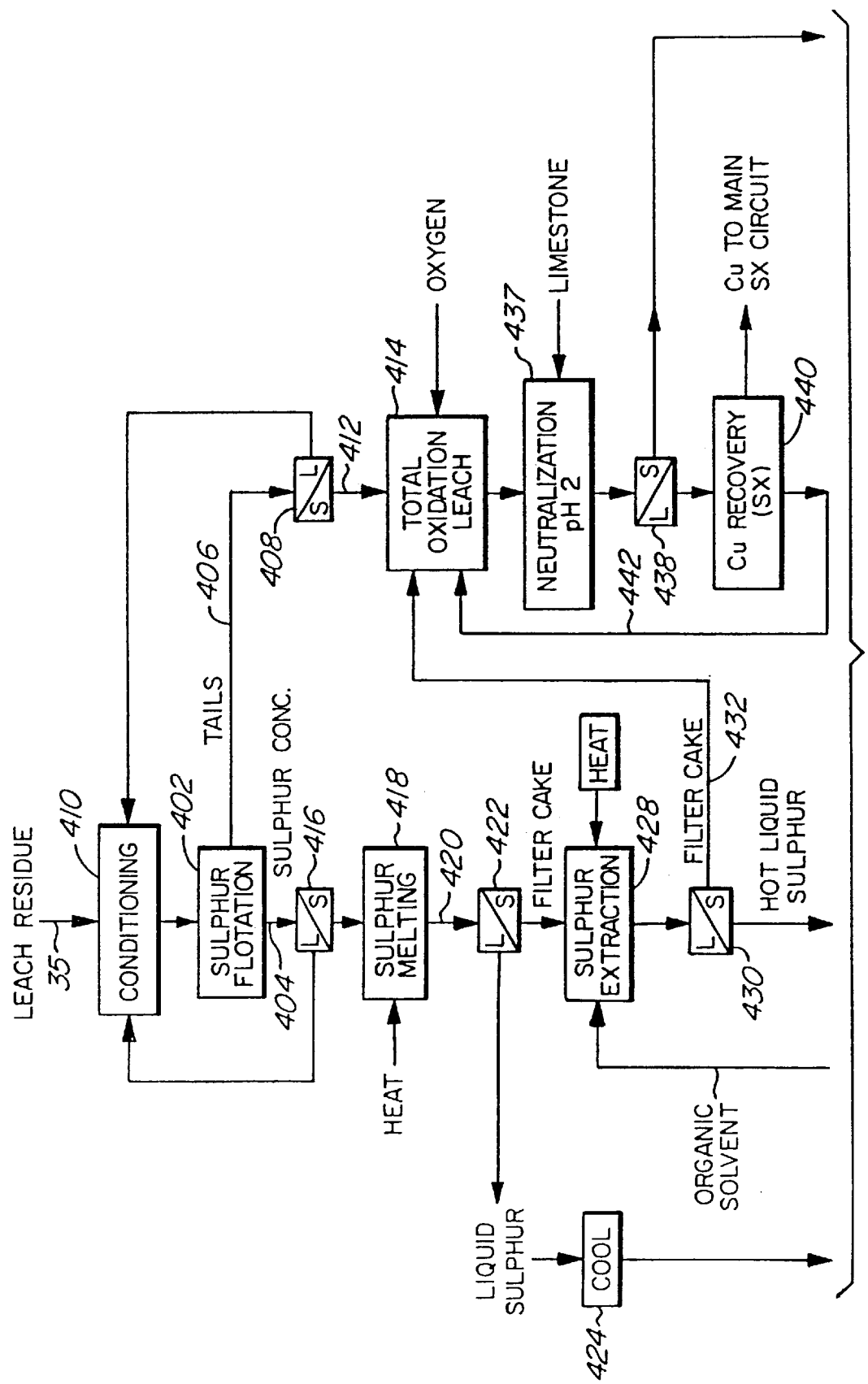
FIGS. 5A and B show a flow diagram of a further embodiment of the process according to the invention for the recovery of precious metals from an ore or concentrate.
Figure 5B:
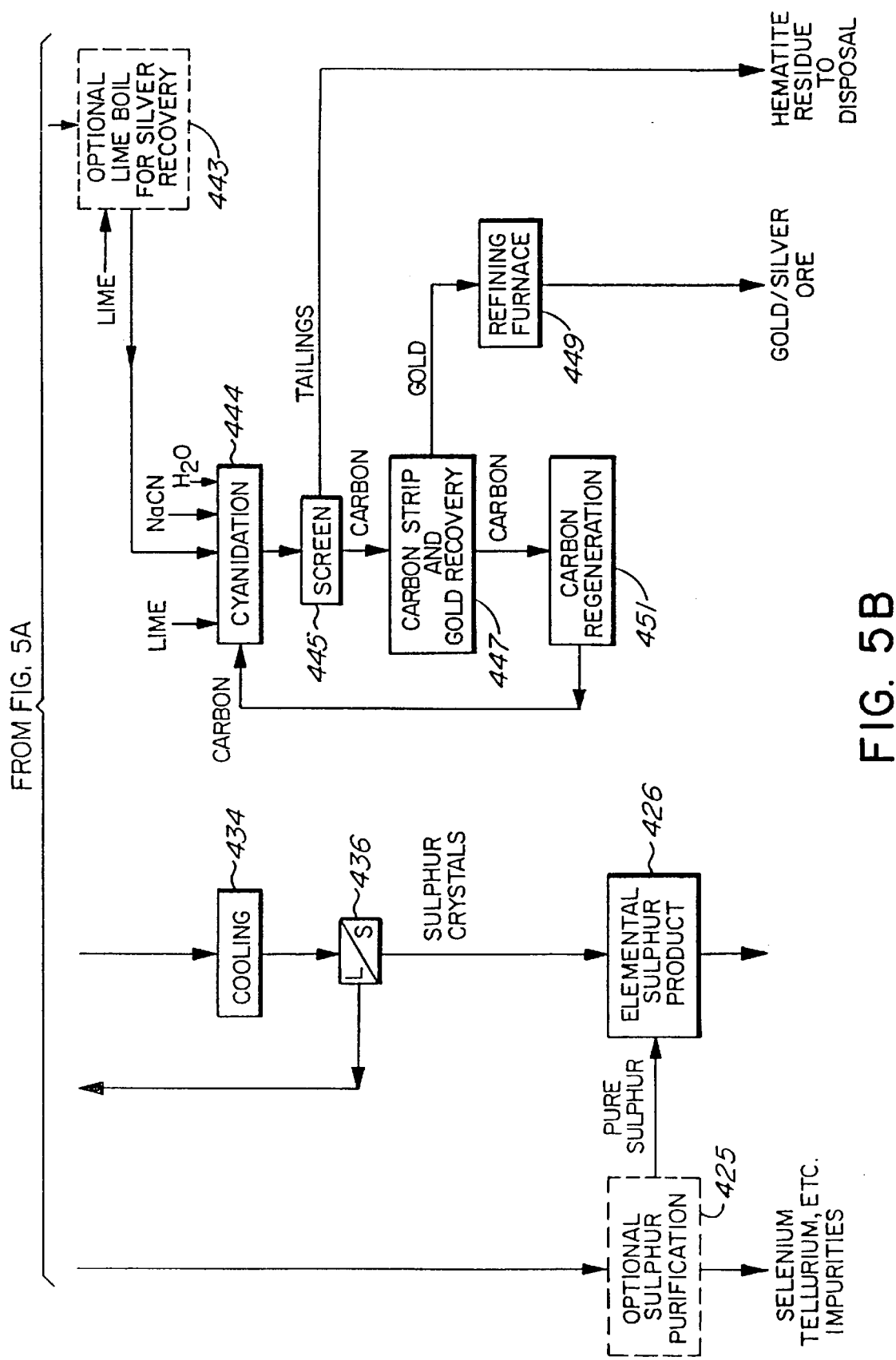

The residue 35 from the atmospheric leach stage 14 is treated for sulphur and precious metals recovery (39) as will be described below with reference to FIG. 5.

The raffinate 37 from the Cu solvent extraction 16 is split into two streams 120 and 121 in the ratio of ⅔ to ⅓, as in the FIG. 2 embodiment. The stream 120 is recycled to the atmospheric leach 14, whereas the stream 121 is subjected to neutralization 46 at a pH of about 4 and then subjected to a liquid/solid separation 48.

The raffinate 63 from the Cu solvent extraction 50 is subjected to neutralization 76 at pH 2 with limerock and then subjected to a liquid/solid separation 78. The solid gypsum residue 80 is discarded with the gypsum residue 53 from the liquid/solid separation 48.

The liquid phase from the liquid/solid separation 78 is subjected, with the liquid phase from the liquid solid separation 48, to solvent extraction 246 with a suitable zinc extractant, such as diethylhexylphosphoric acid (DEHPA), to produce a loaded Zn organic. This organic stream is carefully purified of Cu, Co, Cd, Cl, etc., before stripping with spent acid from a subsequent zinc electrowinning stage. The purification can be effected by scrubbing of the loaded organic using aqueous $ZnSO_4$ solution. The raffinate is recycled to the pressure oxidation stage 12.

The raffinate from the Zn solvent extraction is recycled to the pressure oxidation stage 12. Any traces of DEHPA left in the raffinate will be subjected to the highly oxidizing conditions of the pressure oxidation stage 12 to counteract contamination of the hydroxy-oxime copper extractant with DEHPA. It has been found that contamination of the hydroxy-oxime reagent with DEHPA results in the deterioration of the former reagent.

The recovery of precious metals, such as gold and silver, will now be described with reference to FIGS. 5A and B. This process involves the treatment of the final residue stream 35 in FIGS. 1, 2 and 4.

The precious metals are not leached during the pressure oxidation stage 12 but remain in the solid residue 35 remaining after the atmospheric leaching stage 14.

In order to facilitate precious metal recovery, the flash down 22 from the pressure oxidation stage 12 is carried out in two stages. The first stage is at a temperature slightly above the freezing point of elemental sulphur, i.e. about 120° to 130° C. with a corresponding steam pressure of about 10 to 20 psig (70–240 kPa). The process is preferably carried out in a continuous mode, the retention time at the first flash let-down stage being about 10 to 30 minutes.

The second flash let-down stage is at atmospheric pressure and about 90° to 100° C. with a retention time of again at least 10 minutes. This allows the elemental sulphur, which is still molten in the first flash-down stage, to convert to one of the solid phases, such as the stable orthorombic crystalline phase. This procedure facilitates the production of clean crystals of elemental sulphur which is important to the recovery of the precious metals from the leach residue.

The leach residue 35 now produced by the atmospheric leaching stage 14 contains, in addition to the precious metals, hematite, crystalline elemental sulphur, unreacted sulphides (pyrite) and any additional products that may result from the particular concentrate being used, e.g. gypsum and iron hydroxides.

Gold in the residue 35 is believed to be largely untouched by the process so far and most likely is in the native state. Silver, however, is oxidized in the pressure oxidation stage 12 and is probably present as a silver salt, such as silver chloride or silver sulphate.

It has been found that conventional cyanidation does not leach gold well from the residue 35. It is believed that this is due to the encapsulation of the gold in mineral particles, such as pyrite. The gold can however be liberated by the pressure oxidation of these minerals, referred to as "total oxidative leaching" or "pyrite leach". In order to effect such leaching without oxidizing elemental sulphur also contained in the residue 35, the process comprises the step of removing as much of the elemental sulphur as possible.

Firstly, by virtue of the two stage flash-down, good quality sulphur crystals are produced. Secondly, the leach residue 35 is subjected to froth flotation 402 to produce a sulphur rich flotation concentrate 404 and a sulphur depleted flotation tail 406. The tail 406 is subjected to a solid/liquid separation 408 to produce a liquid which is recirculated to a conditioning tank 410 upstream of the flotation step 402 and a solid 412 which is sent to the total oxidative leaching stage 414.

The flotation concentrate 404 is filtered (416), dried to a low moisture and then melted in a melting step 418 at about 130° C.–150° C. to produce a slurry 420 of liquid sulphur and particles of solid minerals.

The slurry 420 is filtered (422) to remove the liquid sulphur which is then cooled (424) to produce an elemental sulphur product 426. The cooled sulphur can be subjected to an optional sulphur purification step 425 to remove impurities such as selenium and tellurium therefrom.

The solid residue from the filtration 422 is subjected to a hot sulphur extraction step 428 at 90° C. with kerosene or other suitable extractant, such as perchloroethylene. The resulting hot slurry is filtered (430) to produce a low sulphur (less than 5% elemental sulphur) residue 432 which is sent to the total oxidative leach 414. The hot filtrate is cooled (434) to reduce the solubility of sulphur, producing crystalline $S^\circ$ which is filtered off at 436, to return the kerosene which is recycled to the sulphur extraction step 428.

A test was carried out in which 100 g of residue from the atmospheric leach 14 containing 25.1% elemental sulphur ($S^\circ$) and 3% sulphide was processed through flotation 402, melting 418 and extraction 428. This produced 73.8 g of desulphurized residue (feed material for the total oxidation leach 414) containing 1.9% $S^\circ$ and 4.1% sulphide, i.e. a total of 6% total sulphur.

The desulphurized residue contained 5.9% of the elemental sulphur ($S^\circ$) in the original leach residue, i.e. 94.1% was recovered to a pure elemental sulphur product.

The total oxidative leach 414 is carried out at about 200° C.–220° C. and 50–150 psig (500–1200 kPa) oxygen partial pressure, sufficient to fully oxidize all sulphur and metal compounds to the highest valences, respectively. Thus all sulphur and pyrite are oxidized to sulphate. The oxidation is conducted in acidic conditions, such as with the acid being produced in situ. The reaction is highly exothermic and generally the desired operating temperature can be achieved even with a cold feed slurry, provided there is sufficient fuel present as sulphur in the solid feed. Typically about 6 to 10% of total sulphur will be sufficient with normal percentage solids in the feed slurry.

After the total oxidative leaching 414, the slurry is subjected to neutralization 437 at pH 2–3 with limestone and then filtered (438) to produce a solid residue containing precious metals and a filtrate which is generally acidic and which may contain base metal values, such as copper, which can be extracted by an optional solvent extraction step 440 and sent to the main solvent extraction circuit. The resultant raffinate is recycled to the total oxidation leach 414, as indicated at 442.

Prior the cyanidation 444, the solids from the filtration 438 can be subjected to an optional lime boil step 443 to facilitate the recovery of silver during the cyanidation 444 by the decomposition of silver jarosite compounds formed during the total oxidative leach 414.

The precious metals are in the solids remaining after the filtration 438. Now that pyrite and other encapsulating minerals in the original concentrate have been decomposed, the precious metals are amenable to cyanidation 444.

In the cyanidation step 444, the solids are leached with NaCN under alkaline conditions. In order to effect this, the solids are slurried up with cyanide solution to form a 30–40% solids slurry. Additional NaCN and slaked lime are added as required to maintain a minimum NaCN concentration of about 0.2 to about 0.5 g/L NaCN, with a pH of about 10. The temperature is ambient and usually about 4 to 8 hours retention time is required in continuous mode of operation.

Both gold and silver report in high yield to the cyanide solution, and are recovered typically by the established process of carbon-in-pulp circuit, whereby activated carbon is added to the cyanide slurry to absorb the precious metals, without the necessity of filtration. The loaded carbon, now rich in precious metals is separated by screening (445) and the barren pulp discarded to tailing.

The loaded carbon is treated by established methods to recover the precious metals content by a leach/electrowin/smelt process (447). The product is generally Dore metal containing both gold and silver, which is sent to a gold refinery 449 for final separation of gold from silver. Barren carbon from a carbon regeneration step 451 after the precious metals recovery, is recycled to the carbon-in-pulp circuit 444.

The overall recovery of precious metals by the total process is generally well over 90%, and under optimum conditions approach 99%.

A test was carried out in which desulphurized residue was processed in a total oxidative leach 414 at 220° C. for 2 hours under oxygen pressure and then depressurized and cooled to room temperature. The resultant slurry was neutralized to pH 3 with limestone and then filtered. The filtered cake was then leached with cyanide solution under standard conditions to leach gold and silver.

The gold extraction after the total oxidative leach 414 and cyanidation 444 was 97% with only 1.0 kg/t NaCN consumption. In comparison, the gold extraction on a residue that had not been oxidized in the total oxidative leach 414 was only 34% and cyanide consumption was extremely high at 19.0 kg NaCN/t.

What is claimed is:

1. A process for the extraction of copper from a sulphide copper ore or concentrate, comprising the steps of:

subjecting the ore or concentrate along with a source of bisulphate or sulphate ions to pressure oxidation at a temperature of from about 115° C. to 160° C. in the presence of oxygen and an acidic solution containing halide ions to obtain a resulting pressure oxidation slurry;

subjecting the slurry to a liquid/solid separation step to obtain a resulting pressure oxidation filtrate and a solid residue;

subjecting the pressure oxidation filtrate to a solvent extraction process to produce a copper concentrate solution and a copper depleted raffinate; and recycling the copper depleted raffinate to the pressure oxidation.

2. A process according to claim 1, wherein the halide is selected from chloride or bromide.

3. A process according to claim 2, wherein the halide is chloride and the concentration of the chloride ions in the acidic solution is about 12 g/l.

4. A process according to claim 1, wherein the ore or concentrate also contains zinc along with copper, and further comprising the step of subjecting the copper depleted raffinate to solvent extraction, prior to recycling the raffinate, with a zinc extractant to obtain a concentrated zinc solution for electrowinning.

5. A process according to claim 4, further comprising the step of subjecting the copper depleted raffinate to neutralization prior to the zinc solvent extraction.

6. A process according to claim 1, wherein the ore or concentrate also contains precious metals and further comprising the steps of:

removing elemental sulphur from the solid residue resulting from the pressure oxidation to obtain a low elemental sulphur residue; and subjecting the low elemental sulphur residue to an oxidative leach at elevated temperature and pressure to oxidize elemental sulphur and sulphide minerals present in the low sulphur residue to produce a residue for the extraction of the precious metals therefrom.

7. A process according to claim 6, wherein prior to the sulphur removal, the pressure oxidation slurry is flashed to atmospheric pressure in a two stage let-down in which the first stage is at a temperature above the freezing point of elemental sulphur.

8. A process according to claim 7, wherein the second stage let-down is at a temperature of about 120° to 130° C. and a steam pressure of about 10 to 20 psig (170 to 240 kPa).

9. A process according to claim 8, wherein the second stage let-down is at a temperature of about 90° to 100° C. and at atmospheric pressure.

10. A process according to claim 6, wherein the sulphur removal comprises the steps of:

subjecting the solid residue resulting from the pressure oxidation to froth flotation to produce a sulphur rich flotation concentrate and a sulphur depleted flotation tail;

and subjecting the flotation concentrate to sulphur extraction with a sulphur extractant to produce the low elemental sulphur residue.

11. A process according to claim 10, wherein the sulphur depleted flotation tail is subjected to a solid/liquid separation to produce a liquid which is recirculated to the froth flotation and a solid which is subjected to the oxidative leach.

12. A process according to claim 11, wherein the sulphur extraction of the solid residue is effected at a temperature of about 90°–150° C.

13. A process according to claim 12, wherein the sulphur extractant is selected from the group consisting of kerosene and perchloroethylene.

14. A process according to claim 6, wherein the oxidative leach is carried out at a temperature of about 200°–220° C. and an oxygen partial pressure of about 50–150 psig (500–1200 kPa) under acidic conditions.

15. A process according to claim 1, wherein the ore or concentrate also contains precious metals and further comprising the steps of flashing the pressure oxidation slurry to atmospheric pressure in a two-stage let-down in which the first stage is at a temperature of about the freezing point of elemental sulphur.

16. A process according to claim 1, further comprising the steps of:

removing elemental sulphur from the leach residue resulting from the second leaching to obtain a low sulphur residue; and subjecting the low sulphur residue to an oxidative leach at elevated temperature and pressure to oxidize sulphur and precious metal compounds present in the low sulphur residue to produce a residue for the extraction of the precious metals therefrom.

17. A process according to claim 1, further comprising the step of adding acid to the pressure oxidation to maintain the resulting pressure oxidation slurry at a pH of below about pH 2.

* * * * *